US005512310A

United States Patent [19]

Graef

[11] Patent Number: 5,512,310

[45] Date of Patent: Apr. 30, 1996

[54] PROCESS FOR THE WETTING OF CEREALS WITH A LIQUID

[76] Inventor: Dieter O. Graef, Neumuehle, D-35633, Lahnau-Dorlar, Germany

[21] Appl. No.: 193,010

[22] PCT Filed: Aug. 12, 1992

[86] PCT No.: PCT/EP92/01843

§ 371 Date: Feb. 17, 1994

§ 102(e) Date: Feb. 17, 1994

[87] PCT Pub. No.: WO93/03843

PCT Pub. Date: Mar. 4, 1993

[30] Foreign Application Priority Data

Aug. 17, 1991 [DE] Germany .......................... 41 27 290.0

[51] Int. Cl.$^6$ .......................... A23L 1/00

[52] U.S. Cl. .......................... 426/507; 99/536; 426/519

[58] Field of Search .......................... 426/237, 238, 426/507, 519, 618; 99/516, 536, 471; 366/114, 115, 178

[56] References Cited

U.S. PATENT DOCUMENTS 4,055,673 10/1977 Mueller et al. .......................... 426/519

FOREIGN PATENT DOCUMENTS

| | | |
|---|---|---|
| 796098 | 3/1936 | France . |
| 2234040 | 1/1975 | France . |
| 2540746 | 8/1984 | France . |
| 6577 | 7/1892 | Germany . |
| 87456 | 7/1896 | Germany . |
| 664616 | 9/1938 | Germany . |
| 2331842 | 1/1975 | Germany . |
| 2406874 | 8/1975 | Germany . |
| 9112458 | 12/1991 | Germany . |
| 234921 | 3/1945 | Switzerland . |
| 1094591 | 12/1967 | United Kingdom . |
| 1462904 | 1/1977 | United Kingdom . |

OTHER PUBLICATIONS

Database WPIL, section CH, week 8842, Derwent Publications Ltd., AN 88-298446 6 SU, A, 1 386 290 Apr. 7, 1988, abstract.

*Primary Examiner*—George Yeung
*Attorney, Agent, or Firm*—Foley & Lardner

[57] ABSTRACT

A process for the wetting of cereals with a liquid, wherein the cereal/liquid mixture is exposed for a short time (2 to 15 seconds) to strong vibration (shaking at approximately 80 Hz), with the result that the cereals directly absorb the liquid into themselves and immediately become transportable and can be further processed, for example can be ground, without a substantial storage time. (FIG. 1).

26 Claims, 2 Drawing Sheets

PROCESS FOR THE WETTING OF CEREALS WITH A LIQUID

DESCRIPTION

The invention relates to a process for the wetting of cereals, especially corn grains, with a liquid, designated hereafter for the sake of simplicity as water, and to an apparatus for carrying out the process.

To obtain flour, for example, the flour body (endosperm) of a corn grain is separated from the husk (bran and germs). For this purpose, the corn grains are wetted with water, so that their husk can be softened and subsequently separated more effectively during the grinding operation.

According to the state of the art such as disclosed in FR-A 2,540,746, the corn grains are moved about and, at the same time, mixed with water in a conveying worm. Thereafter, the cereal/liquid mixture is allowed to rest for 10 to 24 hours, depending on the grain quality, so that the water can soften the husk and penetrate inside the kernel. These long standing times are a great disadvantage, since a large space capacity is required for storage during the standing time. This necessary space capacity often restricts the maximum production capacity of a mill.

Furthermore, the long standing time has an adverse effect on the flour quality, since, on account of the dampness of the grain, molds and yeasts and/or bacteria (for example, enterobacterium C) often form and multiply during the long storage time. For this reason, the netted worm, which has a length of between 3 and 8 meters and which is a good seat of germs for mold and/or bacteria, so that the worms must be cleaned frequently, thus leading to interruptions and greatly disrupting the continuous flow.

Similar problems occur in the treatment of other cereals, in which the husk is to be separated from the kernel, such as pulses, maize, rice, beans, also coffee beans, cocoa beans and the like. In brewing too, during the production of a malt, the problem of the long standing time of 80 to 100 hours and more occurs particularly, since the wetted grains are to absorb an especially high water content so that they begin to germinate. FR-A 2,234,040 discloses mixing cereal and water for the malting process by means of nozzles arranged along a conveying table which moves the cereal forward by vibration. This arrangement provides for good mixing, but does not cause the water to penetrate quickly into the husk, thus necessitating a long standing time.

Consequently, the term "cereals" is to embrace all crops which have a kernel and a hard or soft husk or skin surrounding the kernel.

Water can serve as a liquid for treatment. If, for example, maize is to be processed as an extruder product to form popcorn, sugar will be added to the liquid (water) that is to say sugared water will be used. Molasses can come under consideration as a liquid for the preparation of cattle feed.

The object of the invention is to indicate a wetting process for cereals, in which the cereals are wetted with liquid in such a way that the standing time as storage time virtually disappears, and in which the transportability of the cereals wetted with liquid is provided directly, that is to say immediately or after only 10 to 30 minutes.

By transportability it is meant that the cereals wetted, for example, with water no longer have any outer water film which results in adhesive bonding to the means of transport (bands, worms or the like).

This object is achieved by means of an apparatus and process that mixes cereal with liquid and subsequently subjects the mixture to vibration.

It has been shown that, when the cereals mixed with water are exposed to vibrations, that is to say are shaken vigorously, for example at a frequency of 50 to 300 Hz, preferably 75 Hz, over a period of 2 to 20 seconds, the acceleration forces exerted on the cereal/liquid mixture by the wall of the shaking apparatus cause all the water already to penetrate so far into the cereals, at least in their husks, that, although the husks are still felt to be moist on the outside, nevertheless a water film on the cereals can no longer be felt and also is no longer present.

This shaking operation can take place in a careful way, that is to say in such a way that the husks of the cereals are not damaged, so that the liquid directly penetrates in a uniformly distributed manner via the husk of each grain into the latter.

It has been shown, furthermore, that, when the process according to the invention is used, the grindability of such a grain is provided after only 30 minutes to 2 hours, depending on the addition of water, because, in particular, the husk then has the desired degree of moisture uniformly distributed over the entire husk of each grain and can therefore be separated effectively during the grinding operation. There is no need for a long storage of the cereals in order to obtain a uniform moistening with a desired degree of moisture, as in the state of the art.

According to the invention, therefore, the husk of the grain is first permeated uniformly with moisture relatively quickly, and the moisture then penetrates from the husk into the inside of the grain relatively uniformly from all sides.

The advantage of the process according to the invention is thus to be seen in that the grain, after wetting, can be transported to its processing point immediately or after a short dwell time, in order, for example, to be ground directly there, and in that there is no need for intermediate storage of the grain.

It has been shown, moreover, that, in order to obtain a grindable grain, the entire water quantity required can be fed at once, in a single operation, to the cereals, especially to the corn, thereby saving considerable time for the wetting of the corn grains. In the processes which belong to the state of the art and which work with a conveying worm, a plurality of additions of water at time intervals are necessary.

According to the invention, a plurality of additions of water at time intervals are necessary only when the grain, including its kernel, is to absorb a very large quantity of water, for example up to 40 or 50 percent by weight, in order to set in motion the germination process for the production of a malt in the malthouse.

Furthermore, the advantage of the process according to the invention is that, for example, there is no longer any need for a netting worm for mixing the corn with the water, since other simpler means are expedient, such as a simple agitator or a funnel arrangement. Greater cleanliness and therefore better hygiene are achieved thereby. Moreover, an energy saving is obtained, since the drive of the netted worm or of similar apparatuses requires considerably more energy than the shaking apparatus according to the invention.

Above all, however, particularly bacteria and fungi have less opportunity to multiply as a result of the absent storage time.

The apparatus according to the invention expediently consists of a pipe which has a preferably vertically arranged axis and which is connected, for example approximately in its middle, to a shaking motor or a plurality of shaking motors. The cereals, mixed with liquid, for example water, can be introduced into the pipe at the top, and they run out again at the bottom. The throughflow quantity can be regulated by means of measuring and control devices. The dwell time of the cereal/liquid mixture in the pipe can thereby be regulated. In particular, there can be provided at the lower end of the pipe a discharge element which extracts the cereals in the desired quantity from the pipe either continuously or discontinuously. Such a discharge element can be formed, for example, by a cone which is introduced to a greater or lesser extent into the pipe end and which thus either completely interrupts the outflow stream of cereals or selectively allows specific cereal/liquid mixture quantities to escape. However, cellular-wheel sluices, shaking troughs, slides of all kinds or conveying worms also come under consideration for this purpose.

In principle, however, the pipe can also be arranged with a horizontal axis, so that the cereals are pushed in from one side. This shaking can be appropriate when the cereal/liquid mixture is to be shaken in batches.

Advantageously, the pipe has smooth walls on the inside, so that, in particular, the husks of the cereals are not damaged during shaking, because, as already stated if the husks are damaged, the water penetrates into the husk non-uniformly, namely first at the damaged points, so as to advance from here on the one hand further in the husk and on the other hand into the kernel. As a result, the husk is moistened non-uniformly, and therefore the desired exact separation of the husk and kernel during the grinding operation is adversely influenced. This is because, at the points at which the husk is not yet sufficiently moistened, kernel pieces of the grain still adhere firmly to the husk and remain caught on the husk during the grinding operation.

Furthermore, the pipe can have intermediate walls, so that the maximum distance of each grain from one of the walls set in vibration remains small. The cereal/liquid mixture thereby acquires high acceleration during the shaking operation, namely of the order of 5 g to 15 g (g=acceleration due to gravity). Despite this high acceleration, the cereal/liquid mixture does not strike hard against the walls, since the grains mixed with liquid are arranged relatively compactly in the pipe or in the pipe chambers, that is to say the transmission of energy to the cereal/liquid mixture does not take place as a result of hard hocks against this mixture, but because the grains and, if appropriate, the liquid droplets bear against the pipe wall or an intermediate wall. Under these acceleration forces, the liquid itself breaks up into very fine droplets which settle directly on the husks of the cereals and penetrate into the husks.

An appreciable further advantage of the process according to the invention is seen in that, in a further embodiment of the invention, additives can be added to the liquid. Enzymes, such as proteinases, proteases or the like, vitamins, such as ascorbic acid, nitrates, salts and/or sugar can be provided as additives. These additives dissolved in the liquid can vary the properties of the cereals, such as crude fibers, starch, proteins, fats and/or mucous substances, also the cell structures and consequently, for example, the grindability of the grains.

This introduction of the additives into the cereals directly together with the liquid during shaking has the following advantages, for example in flour production:

1. The introduction of additives into the grain before the grinding operation is cheaper than the introduction of additives after the grinding operation by addition to the flour, in which case, according to the state of the art, the additive, for example vitamin C, is added in powder form to the flour.
2. The process according to the invention can be carried out more quickly in time, since, for example in the production of flour, the husks or the flour, after the grinding operation, no longer have to be mixed separately with the powdery additives.
3. The addition of the additives according to the state of the art in powder form can be harmful to health, for example if the additives are breathed in. However, they are also frequently incompatible with the human skin.
4. The mixing of flour with the additives according to the state of the art necessitates a very thorough mixing of the flour with the additives. By means of the process according to the invention, an exceedingly uniform distribution of the additives in the flour is achieved in the simplest way. The mixing with the additives is therefore no longer as cost-intensive and as time-consuming as in the state of the art.

Furthermore, as already mentioned, in addition to the sectors of use stated hitherto, the process according to the invention can be used for the production of malts, such as are required by the beer brewer, in that the cereals are expediently shaken several times at time intervals, along with the addition of a liquid. As a result, more liquid, for example water, can be bound in the cereals in a short time, that is to say the percentage weight fraction of liquid in the grain can be increased well above the customary amount, so that the corn grains begin to germinate in a substantially shorter time. In this particular use, therefore, it is important that a large quantity of water is absorbed by the endosperm itself, in order to bring the grain to germination.

Exemplary embodiments of the invention are illustrated in the drawing, in which.

Figure 1:
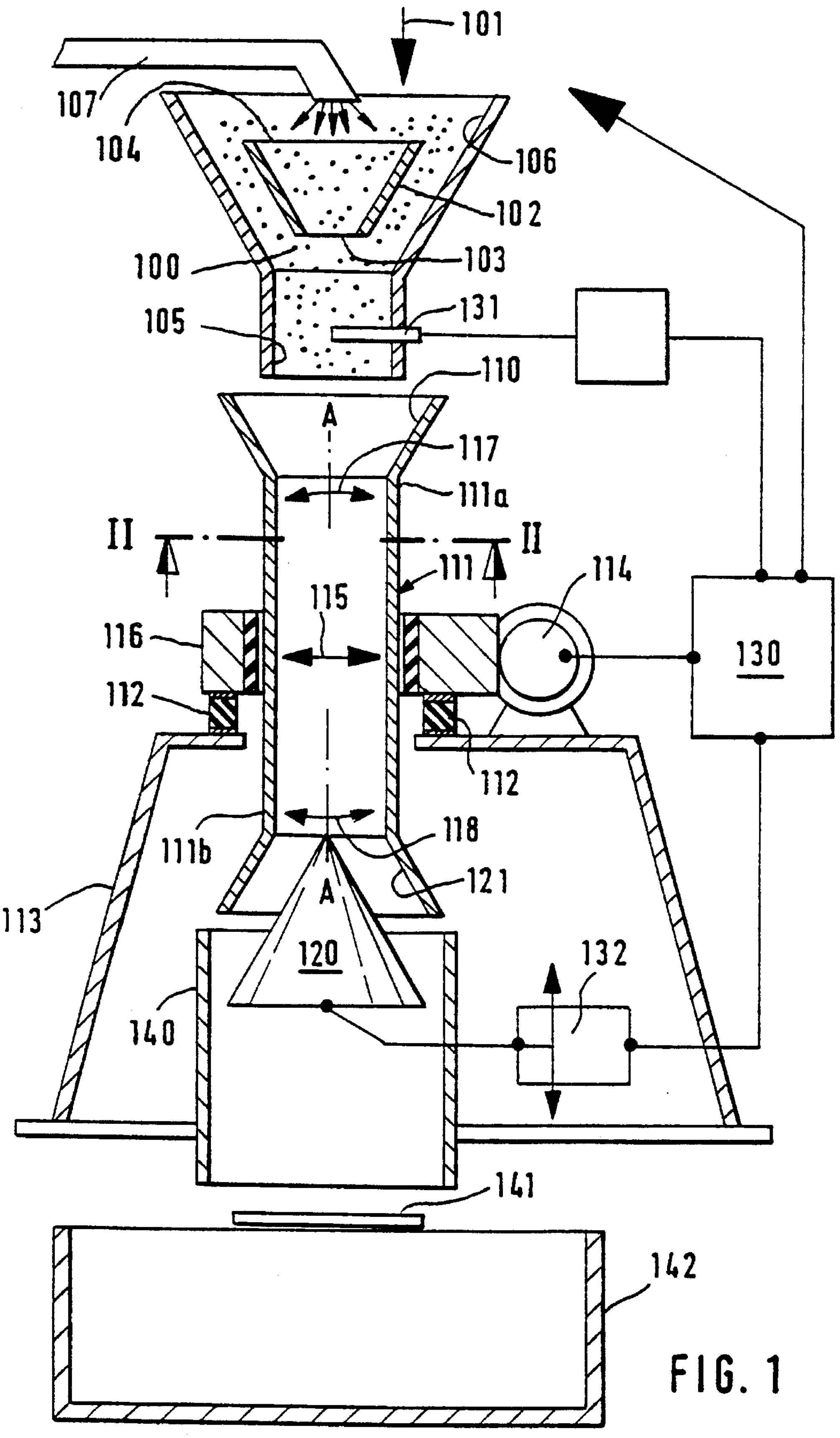
FIG. 1 shows a first exemplary embodiment in section.
Figure 2:
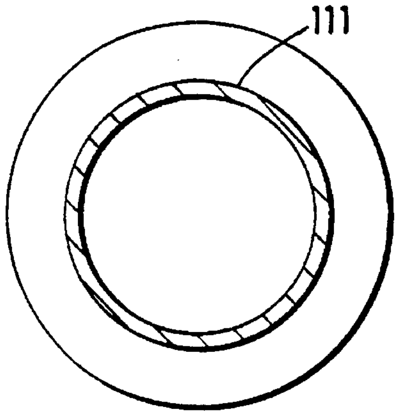
FIG. 2 shows a section along the line II—II of FIG. 1.

According to FIG. 1, corn grains (100) are introduced into a funnel (102) in the direction of the arrow (101), specifically in such a way that fewer corn grains run out of the funnel orifice (103) than are introduced at the top, so that the corn grains spill over the upper edge (104) of the funnel and fall past this through the lower orifice (105) of an outer funnel (106) surrounding the funnel (102). Water is fed to the corn grains in the region of the funnel (102) by means of an inflow (107).

However, a simple agitator or another apparatus can also serve for mixing the cereals with the water.

The corn grains thus mixed with water fall through a widened orifice (110) of an approximately vertically arranged pipe (111). The pipe (111) is mounted on a fixed frame mount (113) by means of rubber buffers (112), in such a way that it can execute movements in the direction of the arrow (115) and its upper part (111*a*) and the lower part (111*b*) can oscillate transversely to the axis A—A of the pipe in the direction of the arrow (115). The pipe (111) carries a cuff (116) which is firmly connected to a shaking motor (114). When the armature of the shaking motor (114) rotates, the cuff (116) and therefore the middle part of the pipe moves to and fro in the direction of the arrow (115), and the ends of the pipe oscillate in the direction of the arrows (117 and 118). A sharp acceleration is thereby imparted via the wall of the pipe (111) to the corn-grain/liquid mixture introduced in the pipe (111), and this acceleration breaks up the liquid by means of imparted vibrations into very fine droplets and distributes then rapidly and uniformly over the entire husk and causes them to penetrate into the husk and from here into the grain. During this operation, the cereals mixed with the water stream from the inlet orifice (110) to the outlet orifice (121). Here, they strike against a closing cone (120) which can be introduced into an outlet orifice (121). Depending on the position of the cone (120) in the outlet orifice, more or fewer cereals can fall past the cone (120). The position of the cone (120) and the length of the pipe consequently determine the dwell time of the cereal/liquid mixture in the pipe (111).

However, instead of the cone, a cellular-wheel sluice known per se, a slide mechanism, a vibrating trough or the like can also be suitably connected to the pipe.

The grain can also run through in batches. In this case, the outlet orifice (121) is closed and, after the introduction of the cereal/liquid mixture, the pipe is shaken for a predetermined time. After the outlet has opened, the wetted cereals flow out of the pipe, and the pipe can be refilled.

A control device (130) is provided for the continuous run-through of the cereals. The control device (130) receives measured values from a measuring sensor (131) which indicates the throughflow quantity of the cereals into the pipe (111). The device (130) regulates the refilling of the funnel (102) with cereals and water. A measuring device (132) measures the outflow quantity of the cereals from the pipe (111). The measuring device (130) controls this outflow quantity and therefore the dwell time of the cereals in the pipe. During the shaking operation, the cereal/liquid mixture rests compactly in the pipe, so that, during shaking, it does not strike against the pipe wall too hard, but on the contrary is exposed to only high acceleration forces.

2 to approximately 15 seconds or more of shaking time are usually required for one pipe filling, that is to say the cereals which have entered at the top are to be shaken in the pipe for approximately 2 to 15 seconds or more, specifically irrespective of whether they are introduced into the pipe and shaken in batches or run continuously through the pipe. The length of the pipe is dimensioned accordingly. A pipe of a length of one meter is normally sufficient.

The cereals emerging from the pipe (111) at the bottom fall through a guide pipe (140) onto a distributor plate (141) and from here into a collecting container (142). The emerging cereals are directly transportable, so that by means of conveyor bands, worms and the like, without adhering to these parts as a result of adhesive forces, they can be transported further to a processing point, without any appreciable period of intermediate storage.

A pipe (111) can have a circular, elliptic or rectangular, even square cross section. It is merely to be ensured that, during the shaking operation, the cereals acquire their acceleration energy to a sufficient extent from the inner wall of the pipe.

Figure 3:
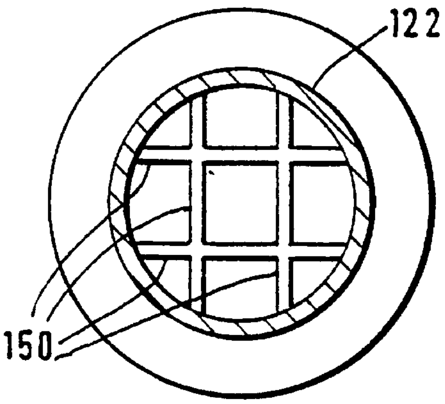
FIG. 3 shows a modified exemplary embodiment according to FIG. 2.

In order to make it possible to cause larger quantities to run through, the diameter of the pipe (111) can be increased. However, the shaking effect consequently decreases towards the inside of the pipe, since the transmission of energy of the cereal/liquid mixture from grain to grain becomes lower towards the middle of the pipe. Consequently, in a further exemplary embodiment according to FIG. 3, there are provided in the interior of a pipe (122) longitudinal walls (150) which form further energy-transmitting walls for the cereal/liquid mixture running through.

Figure 4:
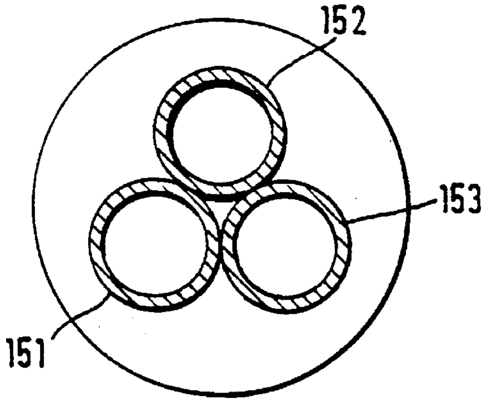
FIG. 4 shows a modified exemplary embodiment according to FIG. 2.

Another solution to this problem is illustrated in FIG. 4. Three pipes (151, 152, 153), which are firmly connected to one another and which can be shaken jointly, are provided here.

Figure 5:
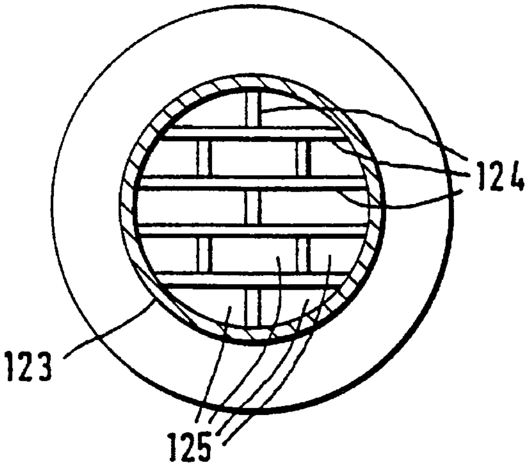
FIG. 5 shows a modified exemplary embodiment.

FIG. 5 shows the pipe (123) with incorporated intermediate walls (124), so that rectangular spaces (125) are obtained in the pipe over the length of the pipe, the transverse walls being at a relatively small distance from one another, so that the rectangular spaces become very narrow. When such a pipe is shaken at a frequency of 75 to 80 Hz, the pipe walls impart to the cereal/liquid mixture an acceleration of five to fifteen times the acceleration due to gravity, with the result that the liquid breaks up and wets the cereals uniformly, in such a way that the liquid penetrates directly into the husks of the cereals. This penetration and also the further penetration of the liquid into the kernel of the cereals is assisted by the acceleration forces exerted on the cereals.

| Reference numerals | |
|---|---|
| 100 | Corn grains |
| 101 | Arrow |
| 102 | Funnel |
| 103 | Funnel orifice |
| 104 | Upper edge |
| 105 | Lower orifice of 106 |
| 106 | Outer funnel |
| 107 | Water inflow |
| 110 | Widened orifice |
| 111 | Pipe |
| 111a | Upper part of the pipe |
| 111b | Lower part of the pipe |
| 112 | Rubber buffer |
| 113 | Frame mount |
| 114 | Motor |
| 115 | Arrow |
| 116 | Cuff |
| 117, 118 | Arrows |
| 120 | Closing cone |
| 121 | Outlet orifice |
| 122 | Pipe |
| 123 | Pipe |
| 124 | Intermediate walls |
| 125 | Elongate rectangular spaces |
| 130 | Control device |
| 131 | Measuring sensor |
| 132 | Measuring device |
| 140 | Guide pipe |
| 141 | Distributor plate |
| 142 | Collecting container |
| 150 | Intermediate walls |
| 151, 152, 153 | Pipes |
| A-A | Pipe axis |

I claim:

1. Process for the wetting of cereals with a liquid, comprising the steps of:

mixing the cereals with a liquid, wherein at least a portion of the cereals have husks;

and subsequently exposing the mixture to vibrations in a shaking apparatus sufficient to impart acceleration forces to at least a portion of said cereal/liquid mixture by the contact of at least a portion of the cereal/liquid mixture with a vibrating wall of said apparatus, which acceleration forces provide a substantially uniform wetting of said cereals and a substantially uniform penetration of the liquid from the husk into the inside of the cereal.

2. Process according to claim 1, wherein the cereals are exposed to the vibrations during the addition of the liquid.

3. Process according to claim 1, wherein the cereals and the liquid are vibrated by vigorous shaking.

4. Process according to claim 3, wherein the cereal/liquid mixture is shaken in at least one pipe of said shaking apparatus, in such a way that the at least one pipe transmits its kinetic energy to the cereal/liquid mixture.

5. Process according to claim 3, wherein the cereal/liquid mixture is shaken at a frequency of 50 to 300 Hz.

6. Process according to claim 3, wherein the shaking time is approximately 2 to 20 seconds.

7. Process according to claim 3, wherein the shaking takes place by means of at least one of mechanical energy, electrical energy, magnetic energy and by exposure to sonic waves.

8. Process according to claim 3, further comprising the steps of introducing the cereals mixed with liquid continuously and/or discontinuously into a shaking apparatus, running the mixture through the apparatus, with at least partial shaking, wherein the mixture emerges or is extracted from the shaking apparatus by at least one of continuously and discontinuously.

9. Process according to claim 4, wherein the cereals are arranged compactly in the at least one pipe or run through the at least one pipe.

10. Process according to claim 3, wherein the shaking is preceded by mixing in a mixing apparatus.

11. Process according to claim 3, further comprising the steps of feeding the cereals to a funnel in such a quantity that they stream out of the lower funnel orifice and fall over the upper edge of the funnel, and directing liquid into the filling orifice of the funnel, wherein the cereals thus moistened are directed or fall into the shaking apparatus.

12. Process according to claim 3, wherein the cereal/liquid mixture is shaken at approximately 10 to 15 g (g= acceleration due to gravity).

13. Process according to claim 1, wherein the cereals are at least one of crops with a hard and soft husk, husked rice, beans and crops which can be extruded.

14. Process according to claim 1, wherein the liquid is at least one of water, sugared water and molasses.

15. Process according to claim 1, further comprising the step of adding to the liquid at least one additive soluble therein which varies at least one property of the cereals.

16. Process according to claim 3, wherein the cereals mixed with the liquid are shaken several times at selected time intervals.

17. Process according to claim 16, wherein the time interval is approximately 30 minutes to 5 hours.

18. Process according to claim 16, wherein the cereals are used in brewing for the production of malts, and are shaken at time intervals, with liquid being added at each time interval.

19. Process according to claim 3, wherein the cereals are shaken without damage to their surface.

20. Process according to claim 1, wherein the cereals are exposed to vibrations in such a way that an osmotic pressure effect is exerted on them when they run through the apparatus.

21. Process according to claim 1, wherein the cereals are grindable corn grains.

22. Process according to claim 1, wherein the cereals are subsequently used in an extrusion process after said vibrating step.

23. Process according to claim 5, wherein said frequency is about 75 Hz.

24. Process according to claim 1, wherein said strong acceleration forces are about at least about 5 g.

25. Process according to claim 16, wherein the selected time intervals are at least one of increasing and decreasing.

26. Process according to claim 15, wherein the at least one property varied is crude fiber, starch, proteins, fats and mucous substances.

* * * * *